Figure 1:
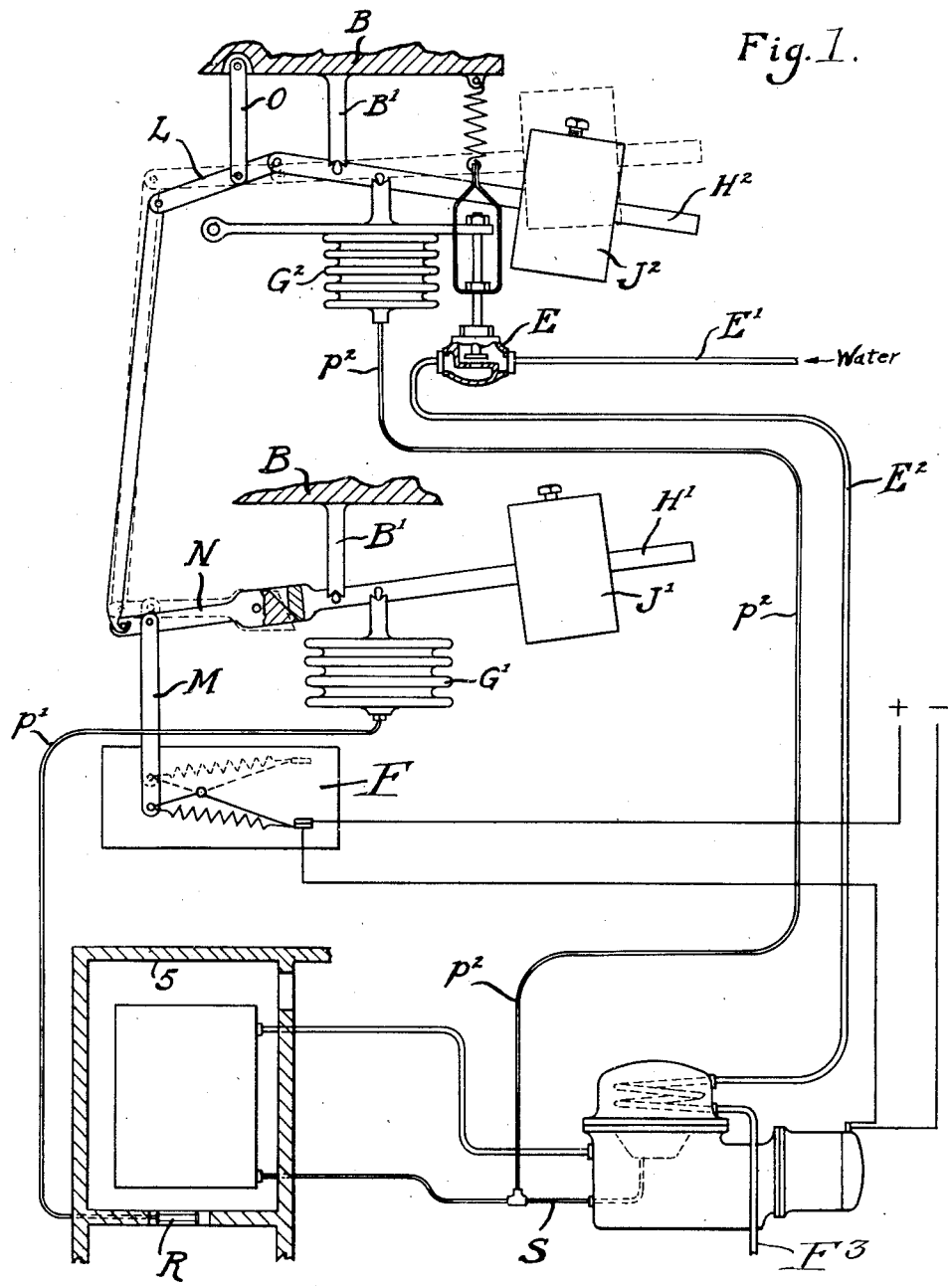

Dec. 25, 1923.

R. E. BECHTOLD ET AL 1,478,421

AUTOMATIC REGULATING AND CONTROLLING DEVICE

Filed Feb. 5, 1917

7 Sheets-Sheet 1

INVENTORS
Reuben E. Bechtold
and Alfred W. Mellows

BY Lloyd Blackmore
THEIR ATTORNEY

Dec. 25, 1923.

R. E. BECHTOLD ET AL

AUTOMATIC REGULATING AND CONTROLLING DEVICE

Filed Feb. 5, 1917

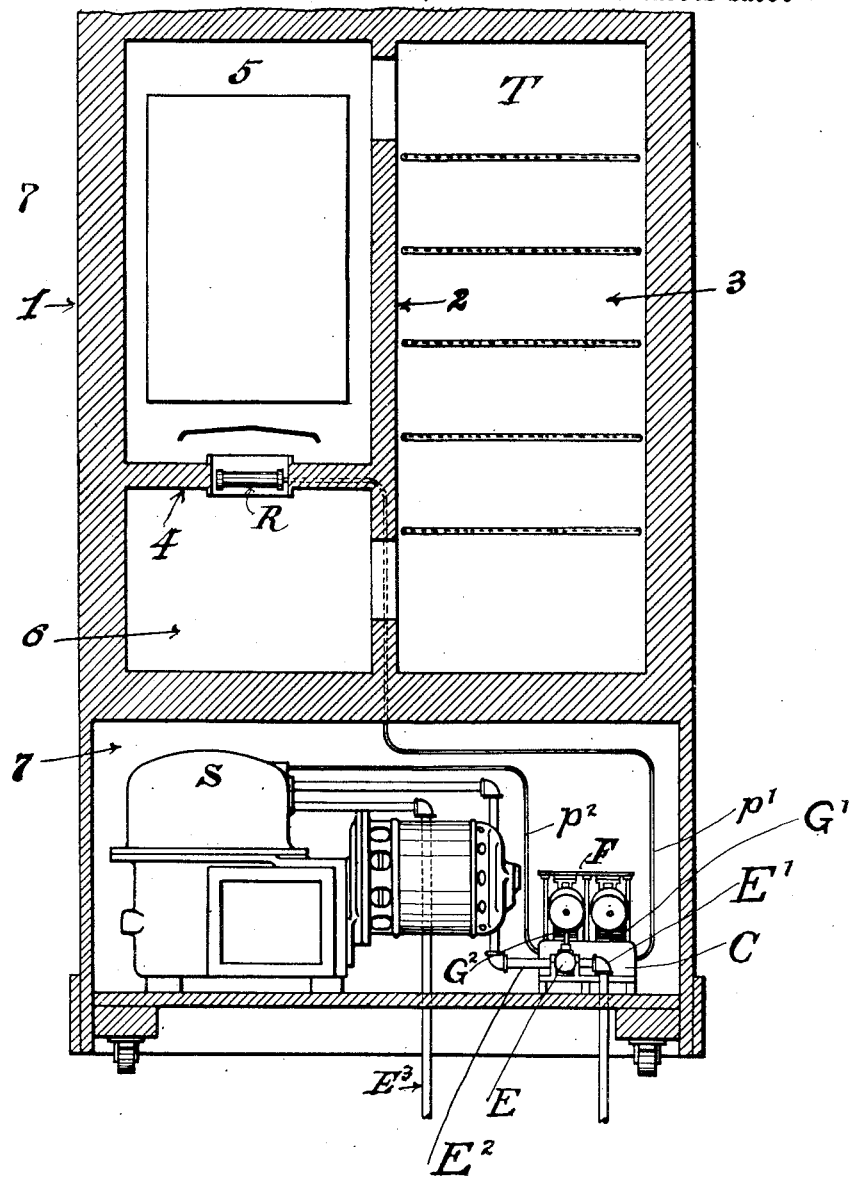

Patented Dec. 25, 1923.

1,478,421

UNITED STATES PATENT OFFICE.

REUBEN E. BECHTOLD AND ALFRED W. MELLOWES, OF DETROIT, MICHIGAN, ASSIGNORS, BY MESNE ASSIGNMENTS, TO DELCO-LIGHT COMPANY, A CORPORATION OF DELAWARE.

AUTOMATIC REGULATING AND CONTROLLING DEVICE.

Application filed February 5, 1917. Serial No. 146,715.

*To all whom it may concern:*

Be it known that we, REUBEN E. BECHTOLD and ALFRED W. MELLOWES, citizens of the United States, residing at Detroit, in the county of Wayne and State of Michigan, have invented new and useful Improvements in Automatic Regulating and Controlling Devices, of which the following is a specification.

Our invention relates to automatic regulating and controlling mechanism whether of temperature or pressure conditions, or both, and is particularly adapted for use in connection with cooling apparatus of the general type described in our United States Patent No. 1,276,612, dated August 20, 1918, for cooling apparatus, or any apparatus designed for a similar or cognate purpose involving similar principles of action.

It will be obvious that any regulating and controlling device of this character must be sensitive to comparatively slight variations in fluid conditions whether of temperature or pressure; and, in order to be really efficient, must involve the inter-relation of these conditions to insure safety and the necessary sensitiveness of control.

Our invention is intended to meet these demands in a wide range of such apparatus; and the type of mechanism herein shown and described embodies: (1) Mechanism for thermostatically regulating the raising of the temperature of compartments used for storing food or other articles, or allowing it to lower by automatically stopping or starting the machine; (2) means for automatically opening the water valve through which the condensing water flows, when the compression starts, and closing the valve when compression ceases; (3) means for shutting off the motive power from the compressor-motor when the water-supply fails. The extent to which the water valve opens depends upon the rate of refrigeration and the temperature of the condensing water when flowing in, affording regulation and complete control.

While our regulating and controlling apparatus has demonstrated that it will actually maintain any desired temperature of the food compartment of a domestic refrigerator, such as indicated, within a range of 1¼°, it is not necessary in such apparatus to provide for such close regulation, since good practical results are attained by allowing a maximum variation of about 3°.

The device herein shown is an automatic controlling mechanism adapted for use on a cooling apparatus suitable for installation in a domestic refrigerator, and, in the accompanying drawings, forming part of this specification:—

Figure 2:
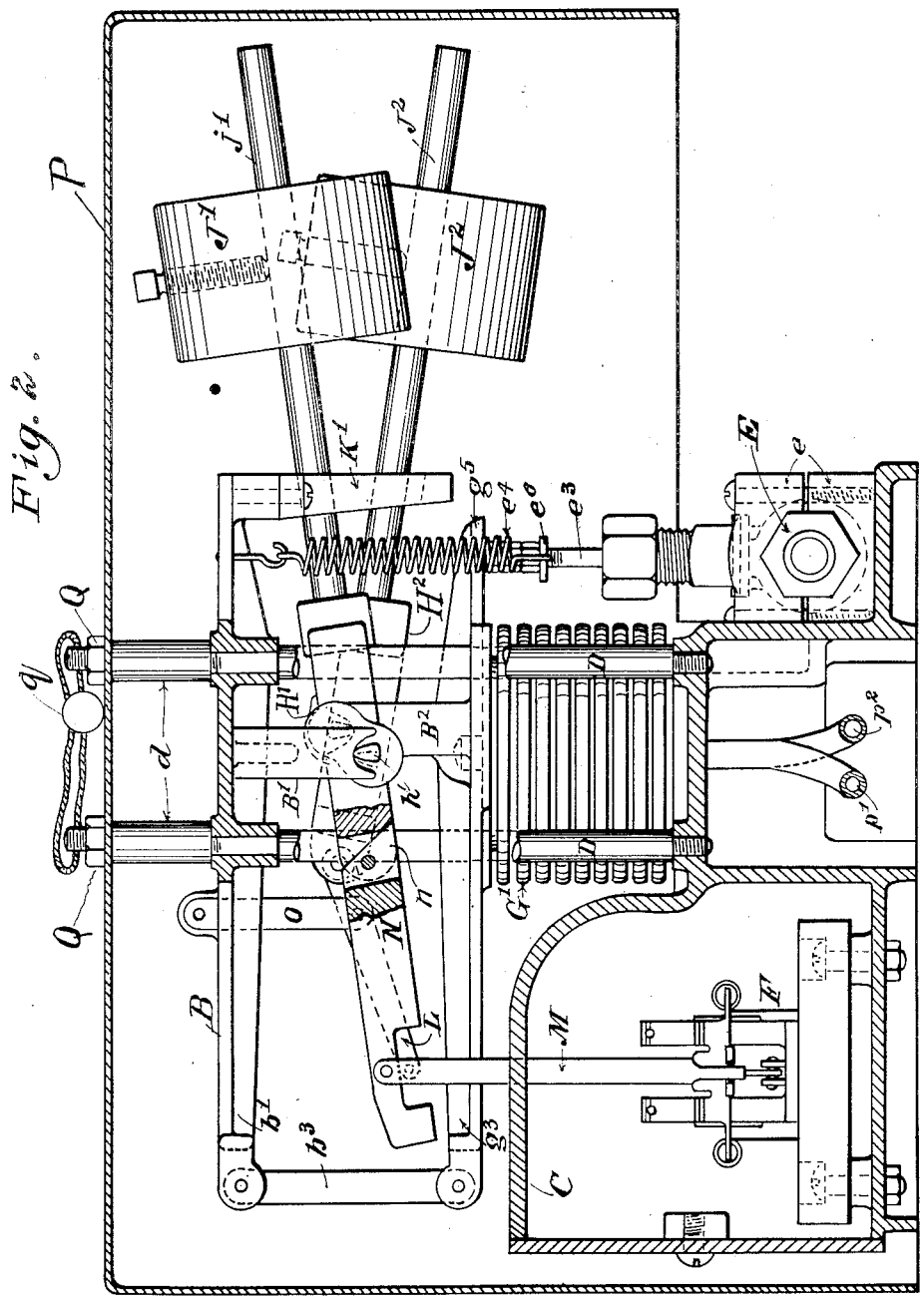
Figure 3:
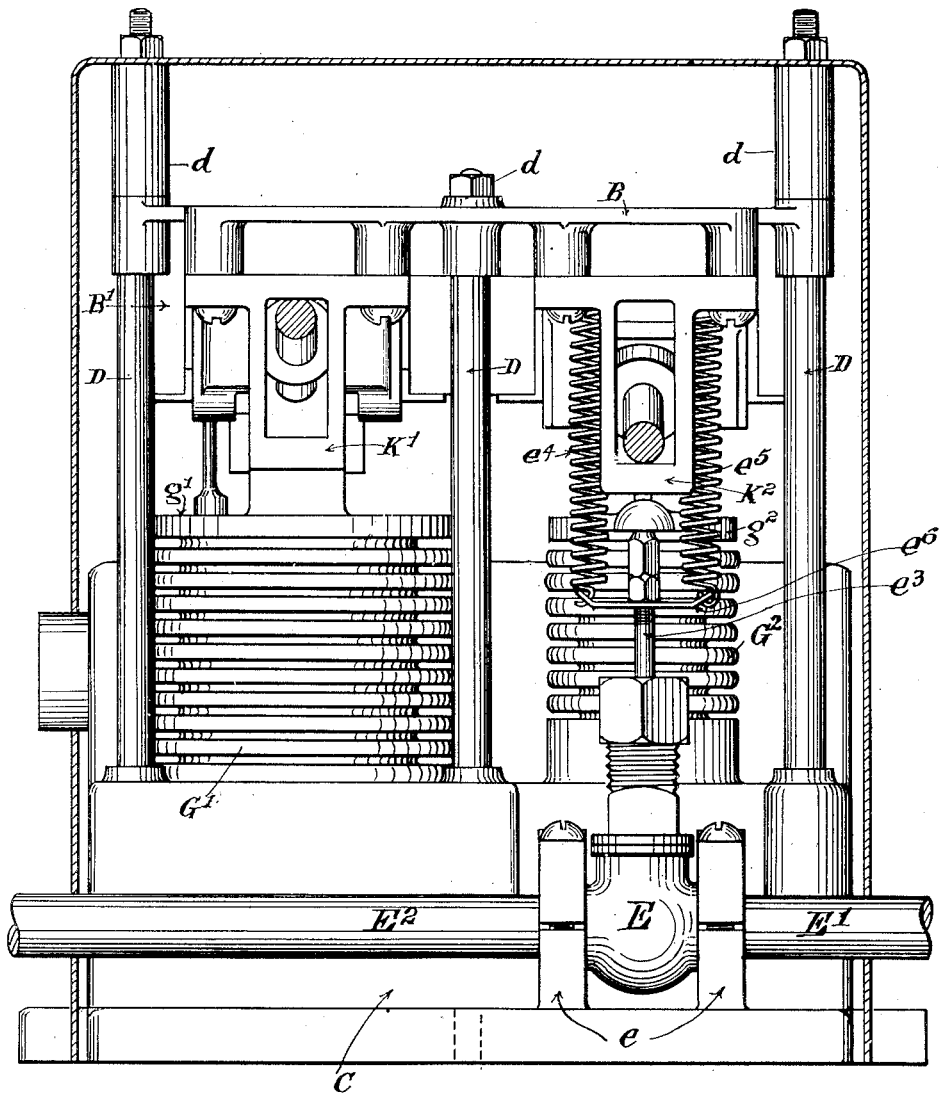
Figure 4:
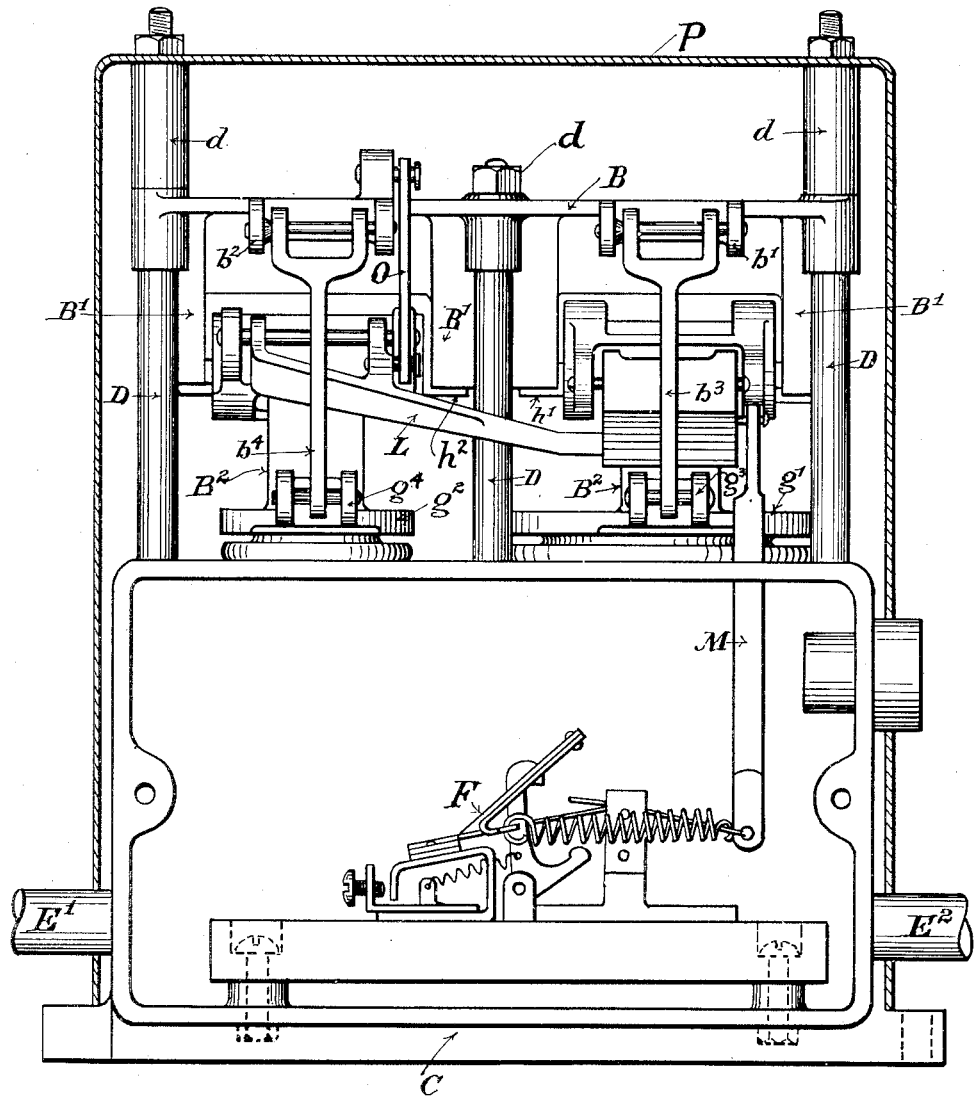
Figure 5:
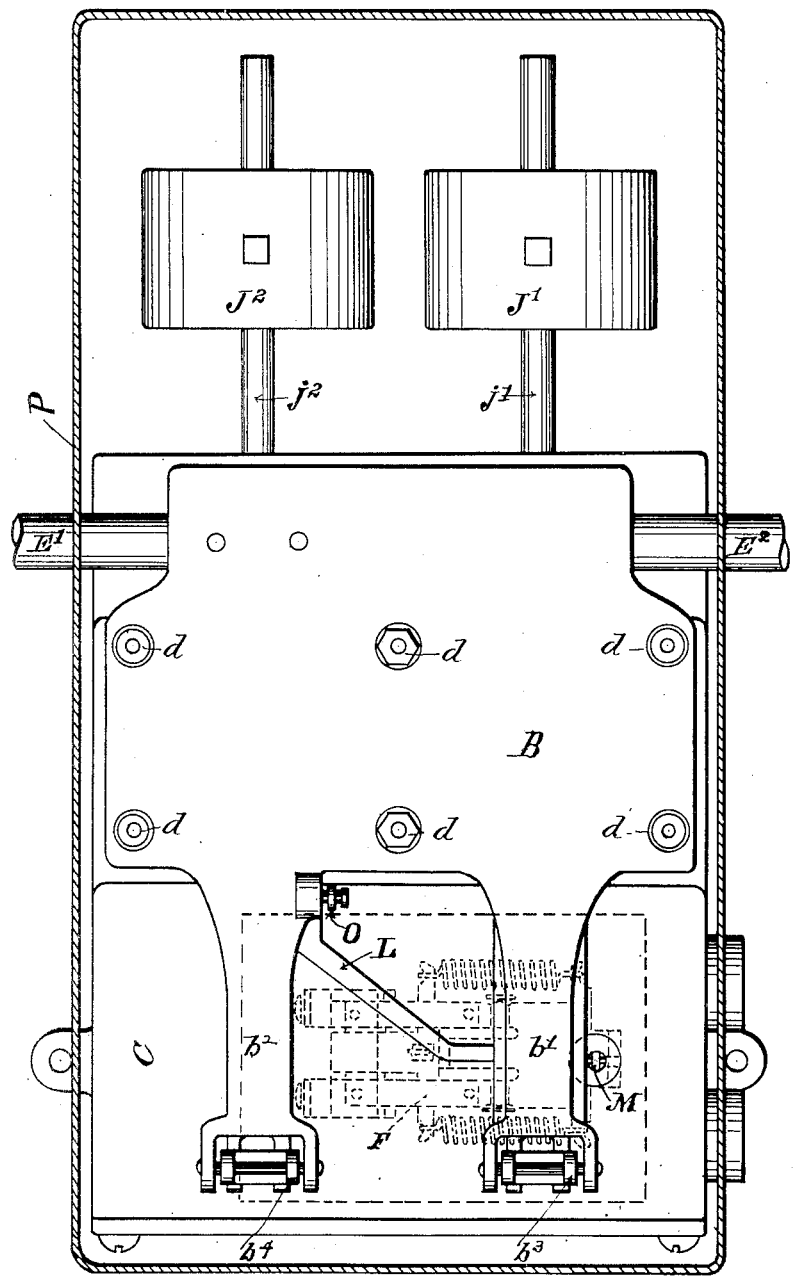
Figure 6:
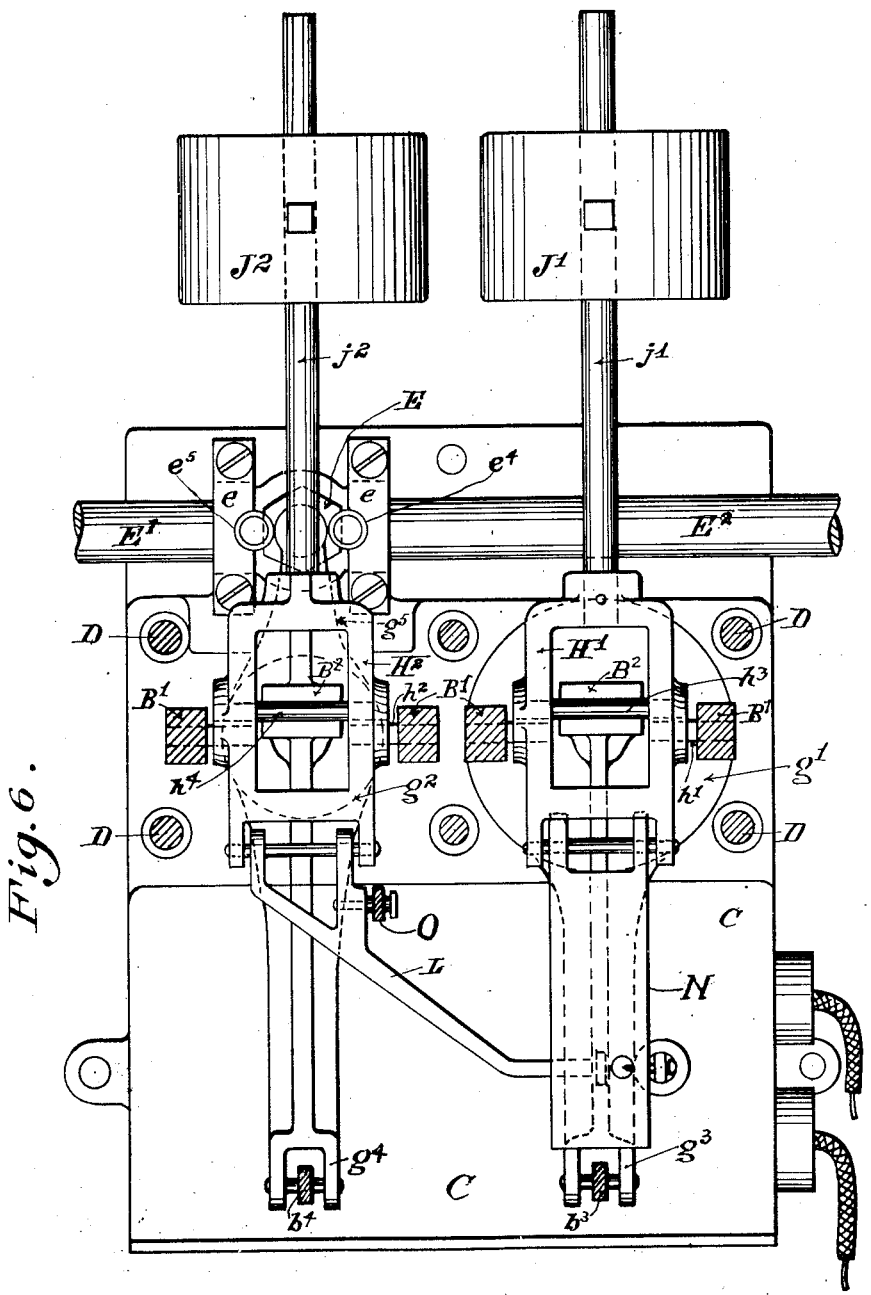

Figure 1 is a diagrammatic view of our controlling mechanism showing its relation to the refrigerating circuit which it controls;

Figure 2, a side elevation of our controller, certain portions thereof being broken away to show more clearly the relation of the parts;

Figure 3, a front elevation with cover sectioned and regulating weights omitted;

Figure 4, a rear elevation with cover sectioned and rear covering plate of the electric switch chamber omitted;

Figure 5, a top plan view, the cover being sectioned to show the top plate and attachments;

Figure 6, a top plan, omitting the cover and top plate, to show the yoke-levers and trunnion bearings in relation to the sylphon bellows; and the adjustable weights; and Figure 7, a diagrammatic vertical section of the refrigerator cabinet showing the controller in position and the pipe connections thereto.

In this specification the principal feature of our invention, to-wit: the controlling and regulating mechanism, is described and shown in detail in the form adapted to use in a domestic refrigerator, the general arrangement of the whole being clearly indicated in Fig. 7 showing a casing 1 divided by a vertical partition 2, on one side of which is a main storage-chamber 3, the space on the other side being divided by a horizontal partition 4 into upper and lower sub-chambers 5 and 6 while at the base of the entire structure is a chamber 7 containing the regulating and controlling mechanism. Air circulating apertures 8 connect the main and sub-chambers above the base as shown—the upper sub-chamber 5 containing the expansion coil (not shown).

The controlling and regulating device embodies a base, C, to which are secured vertical rods D, carrying at their top the top piece, B, rigidly held by studs and nuts, *d*.

Upon the base C at one end is located a water valve E in the condensing water supply pipe $E^1$, $E^2$, of the refrigerating machine rigidly held in place by fastenings, such as clamps, $e$, $e$; and at the opposite end of the base C, there is mounted an electric switch F controlling the supply of motor force for the compressor.

Secured upon the base between the valve, E, and the electric switch, F, are two sylphon bellows, $G^1$, $G^2$, free to expand upwardly, provided with top caps or plates, $g^1$, $g^2$, extended rearwardly as at $g^3$, $g^4$, (Fig. 6) respectively. The top piece, B, referred to, is correspondingly extended rearwardly by prongs, $b^1$, $b^2$, above said sylphon bellows plate extensions, $g^3$, $g^4$;—the latter being held in pivotal suspension by links, $b^3$, $b^4$, respectively, from the prongs, $b^1$, $b^2$. The cap-plate, $g^2$, has a short forward extension, $g^5$, over the stem, $e^3$, of the valve, E; normal contact between the stem, $e^3$, and extension $g^5$, being maintained by two coiled springs, $e^4$, $e^5$, upholding, from the top piece, B, above the ends of a yoke, $e^6$, adjustably seated on the valve stem, $e^3$.

The top piece, B, is also provided with depending abutments or bearings, $B^1$, having their lower faces suitably beveled for knife-edge trunnions, $h^1$, $h^2$, of yoke shaped levers, $H^1$, $H^2$, extending forward over the sylphon bellows; and the top plates, $g^1$, $g^2$, of the sylphon bellows, respectively, have each a short upward extension forming an abutment, $B^2$, whose upper face is similarly beveled for reception of a knife-edge crossbearing, $h^3$, $h^4$, secured in and extending between the yoke-jaws of the levers, $H^1$, $H^2$, respectively, slightly eccentric to the trunnions, $h^1$, $h^2$. The yoke-levers, $H^1$, $H^2$, are extended forward by rods, $j^1$, $j^2$, respectively, and provided with adjustable counterweights, $J^1$, $J^2$. Suitable guide-yokes or stops, $K^1$, $K^2$, are suspended at the underside of the top plate, B, for the reception and play of the rod-ends, $j^1$, $j^2$.

The lever $H^2$, carries pivotally connected at its rear end an extension lever, L, pivotally suspended from the top plate B by means of a link, O, constituting a self-adjusting or swinging fulcrum.

The lever $H^1$ extends rearwardly, and at its rear end carries a weighted extension N, pivoted to the lever $H^1$, but provided with a stop $n$ to limit its movement and this extension, N, is operatively connected with the electric switch F by means of the link M. The weight of the extension N is sufficient to close the switch F through the link M, which is made of insulating material unless the switch is itself insulated.

The lever L at its rear end is extended laterally to and beneath the rear end of the extension N with which latter it contacts in the upward movement of the lever L, and the extension N is thereby lifted independently of lever $H^1$ upon occasion, as shown by dot-and-dash lines in Fig. 1.

The sylphon bellows, $G^1$, is connected by means of a small, flexible (preferably copper) tube, $p^1$, to the thermostat bulb R in the refrigerator. The sylphon bellows, $G^2$, is connected by a small tube, $p^2$, to the high-pressure side G of the refrigerating machine. (Fig. 7.)

The inlet side $E^1$ of the water valve E (Fig. 3) is connected to the condensing water supply, and the outlet side $E^2$ of the valve E is connected to the condenser of the refrigerating machine. The pipe $E^3$ is the condensing-water waste from the condenser of the refrigerating apparatus.

The electric switch F is connected either directly to the motor operating the refrigerating machine, or to a relay operating a switch for said motor.

Diaphragms, bellows, pistons or equivalent means may be used instead of the sylphon bellows.

The details of the electric switch are not material to be described here since many other forms than that shown may serve the purpose.

To assist the comprehension of the operation of the device as a whole, we premise same by a general statement of its three-fold function, namely: First: opening or closing the electric switch F for stopping or starting the electric motor driving the refrigerating machine, as the temperature in the refrigerator or the substance to be cooled falls below or rises above a predetermined temperature, which may be regulated by adjustment of the weight $J^1$ on the rod $j^1$;

Second: opening or closing the valve E and thus controlling the condensing water supply to the condenser of the refrigerating machine as the machine is started or stopped; also regulating the amount of condensing water thus supplied, depending upon the amount desired to give a predetermined condensing-water-outlet-temperature. This temperature may be varied to suit conditions by readjusting inwardly or outwardly the counter-weight $J^2$ on the rod $j^2$;

Third: in case the condensing water supply or discharge becomes clogged or the water is accidentally or intentionally shut off while the refrigerating machine is still running, this device automatically opens the switch and thus stops the motor driving the refrigerating machine when the pressure on the high pressure side of the refrigerating machine reaches a predetermined point, which is well inside the safe working limits of the refrigerating apparatus.

The operation for each of the above three functions will be given separately:

(1) The pressure on the inside of the sylphon bellows, $G^1$, varying as the temperature of the volatile liquid in the bulb R located in the refrigerator T, or the substance to be cooled, causes the extension or contraction of the bellows, $G^1$, and consequently a vertical motion of the cap plate $g^1$, which is fulcrumed on the link $b^3$. The vertical motion of the plate $g^1$ causes a pivotal motion of the lever $H^1$ through the knife-edge $h^3$ and extension $B^2$,—the lever $H^1$ having for a fulcrum the knife-edge $h^1$ on the extensions $B^1$ on the under side of the top plate B. The counter-weight $J^1$ is adjusted so as to attain the balancing of the lever $H^1$ at the temperature determined upon. The volatile liquid in the thermostat bulb produces an increased or decreased pressure in the bellows corresponding to every increase or decrease in its temperature. A slight variation in the pressure in the bellows $G^1$ causes the free motion of the lever $H^1$. This motion of the lever $H^1$ is communicated through the weighted lever extension N and the rod M, opening or closing the electric switch F as the pressure in the bellows $G^1$ falls or rises.

(2) The pressure on the inside of the sylphon bellows $G^2$, which is connected by means of the small tube $p^2$ to the discharge side of the compressor, varies with the pressure on the discharge side of the compressor. As this pressure varies with the outlet temperature of the condensing water, the bellows $G^2$ will be extended or contracted as this pressure rises or falls. The extension or contraction of the bellows $G^2$, therefore, causes a vertical motion to the cap plate $g^2$. The amount of motion of the plate $g^2$ and also the pressure on the inside of the bellows $G^2$ at which this motion begins, is controlled by means of the counter-weight $J^2$ through the lever $H^2$ and knife-edges $h^2$ and $h^4$. The upward motion of the plate $g^2$ as the pressure increases, permits the springs $e^4$ and $e^5$ to lift the valve stem $e^3$ in the water valve E, thus opening the water valve E and supplying condensing water to the condenser of the refrigerating machine. A reduction of the pressure on the inside of the bellows $G^2$ permits the counter-weight $J^2$ to force downwardly the cap plate $g^2$ through the levers $H^2$ and the knife-edges $h^2$ and $h^4$. The extension of the plate $g^2$ forces down the valve stem $e^3$ on the valve E, thus reducing or completely shutting off the condensing water supply to the condenser of the refrigerating machine. In this way the consequent slight increase in pressure on the high pressure side of the compressor, due to starting up the refrigerating machine, by the operation of the device controlling the temperature in the refrigerator or substance to be cooled causes the opening of the valve E and the turning on of the condensing water. Conversely, when the motor driving the refrigerating machine is stopped, the compression ceases and the consequent fall in pressure on the high pressure side of the refrigerating machine will cause the device to close the valve E, thus shutting off the condensing water supply until the machine is again started. The counter-weight $J^2$ may be adjusted so as to maintain a practically constant condensing-water-outlet-temperature, regulating the amount of condensing water supplied, depending upon its inlet temperature and the amount of work done by the refrigerating machine.

(3) In the event the condensing water supply or discharge becomes clogged and greatly reduces the normal flow; or, if it becomes shut off altogether,—the refrigerating machine continuing operation,—the pressure on the high-pressure side of the compressor will continue to rise, due to lack of sufficient condensing water to carry off the heat. The pressure on the inside of the sylphon bellows $G^2$ also continues to rise, and, as in No. 2, the valve E will be opened a little more in order to supply more water. If, however, further opening of this valve is not followed by a supply of more water and a reduction in pressure of the refrigerant, the lever $H^2$ further lifts the rear end of lever L and through it lifts the rear end of the weighted extension N and link M and causes the opening of the electric switch F, thus stopping the driving motor of the refrigerating machine. As soon as the condensing water is turned on, and the pressure in the sylphon bellows $G^2$ falls, the lever $H^2$ lowers the rear end of the lever L and permits the normal operation of the device by the thermostat bulb in the refrigerator, as in No. 1.

It will thus be seen that our device contemplates an inter-related control of the initial motive-power for driving the compressor, at one side of the system, and a control of the supply of condensing-water at the other side of the system; and is actuated either by the relative pressure attained in the refrigerating apparatus or by the temperature of the refrigerator chamber containing the thermostat bulb, or both, as the case may be; and tends to maintain a predetermined temperature in the refrigerator and condensing water, regulated as may be desired.

To insure against tampering by unauthorized persons, the device is provided with a metal cover, P, securely held in place by nuts Q and seal $q$.

We claim as our invention and desire to secure by Letters Patent of the United States:

1. A device of the character indicated, embodying in combination a bellows operatively connected with the supply of motor fluid or force to the apparatus with which said device is used; means for producing proper resistance to be overcome by the action of said bellows; a second bellows operatively connected with a valve governing the supply of non-motive fluid to said apparatus; means for producing proper resistance to be overcome by the action of said second bellows; and an operative connection between the two mechanisms whereby an excess of motion in said second bellows beyond the normal limit shuts off the said supply of motive fluid or force.

2. In a governing device of the character indicated in combination with a sylphon bellows, a lever operated thereby having its pivoted bearings upon knife-edge trunnions set in opposite directions, and a pivoted end-support upon a swinging fulcrum.

3. In a controlling device of the character indicated a sylphon bellows suitably mounted upon a containing frame and a lever fulcrumed on the frame, extending forward over and operatively connected with the bellows, and an adjustable counter-balancing weight secured to the forward projection of the lever.

4. In a controlling device of the character indicated a pair of sylphon bellows, and a corresponding pair of levers each suitably mounted and operatively connected with a sylphon bellows, one of said levers being operatively connected with an electric switch or other controlling element of the compressor, and the other lever being operatively connected with the valve controlling the admission of condensing water.

5. In a refrigerating device of the character indicated, in combination with refrigerating apparatus, a pair of sylphon bellows or diaphragms operating by fluid pressure, each provided with an adjustably-weighted and normally-balanced lever, one of said bellows being operatively connected with refrigerated chamber and governed by the temperature of its atmospheric content to control the driving force actuating the compression mechanism, and the other of said bellows operatively connected with the high pressure side of the compressor and operated by the pressure of the compressed refrigerant to control and regulate the flow of condensing water; said actions being synchronously accomplished through the medium of said levers respectively.

6. Refrigerating apparatus embodying in combination a bellows operatively connected with the supply of motor fluid or force, means for producing proper resistance to be overcome by the action of the said bellows, a bellows operatively connected with a valve governing the supply of condensing water to the refrigerating apparatus, and means for producing proper resistance to be overcome by the action of the said second bellows.

7. In a device of a class described, a switch adapted to control a circuit through which current is supplied to an electric motor; an expansible and collapsible diaphragm operatively connected with said switch to open and close the same; means for subjecting said diaphragm to the action of a fluid under pressure; a water supply conduit; a valve for controlling the flow through said conduit; a second expansible and collapsible diaphragm operatively connected with said valve and adapted to vary the extent of opening thereof to thereby regulate the amount of water flowing through said conduit; and a second means for subjecting said second diaphragm to the action of a fluid under pressure.

8. In a device of the class described, a switch adapted to control a circuit through which current is supplied to an electric motor; pressure operated mechanism operatively connected with said switch to open and close the same; a water supply conduit; a valve for controlling the flow through said conduit; pressure operated mechanism operatively connected with said valve and adapted to vary the extent of opening thereof, to thereby regulate the amount of water flowing through said conduit; and means operated by said last mentioned pressure operated mechanism for opening the switch aforesaid, to thereby bring about the stopping of the motor.

9. In a device of the class described, a switch adapted to control a circuit through which current is supplied to an electric motor; an expansible and collapsible diaphragm operatively connected with said switch to open and close the same; means for subjecting said diaphragm to the action of a fluid under pressure; a water supply conduit; a valve for controlling the flow through said conduit; a second expansible and collapsible diaphragm operatively connected with said valve and adapted to vary the extent of opening thereof; a second means for supplying fluid under pressure to said second mentioned diaphragm; and means operated by said second mentioned diaphragm for opening the switch aforesaid, to thereby bring about the stopping of the motor.

10. In a device of the class described, a switch for controlling a motor, thermally controlled means for automatically opening and closing said switch, a water supply conduit, a valve therein, pressure operated means for opening and regulating said valve and interengaging means between said thermally controlled and pressure operated means, for opening said switch by excess of pressure in said pressure operated means.

11. In a device of the class described, a switch for controlling a motor, thermally controlled means for operating said switch, a pressure controlled device, and means interconnecting said thermally controlled means and pressure controlled device whereby an excessive pressure in said device will cause the same to open said switch substantially as shown and described.

12. In a device of the class described, a switch for controlling a motor, thermally controlled means for operating said switch, a conduit, a valve in said conduit, pressure operated means for controlling said valve, and means for permitting said pressure operated means to open said switch when the pressure exceeds a predetermined limit and for restoring the switch to the control of said thermally controlled means when the pressure falls below that limit, substantially as shown and described.

13. In a refrigerating system through which refrigerant is circulated by a switch-controlled motor compressor and in which the refrigerant is condensed by the circulation of liquid through a valve controlled passage, two bellows motor devices one of which controls the switch, the other motor device controlling the valve and at high pressure of the refrigerant controlling the switch also.

14. In a refrigerating system through which refrigerant is circulated by a motor-compressor the current for which passes through a switch, a first bellows device and a second bellows device both connected to said switch, the first bellows device operating the switch to open and close the same in accordance with the temperature in the refrigerating chamber of the system and said second bellows device operating to open said switch upon an inordinate rise in pressure of the refrigerant.

15. An automatic regulating device for refrigerating apparatus including thermally controlled means for starting and stopping the compressing motor and means associated with said thermally controlled means and controlled by the pressure of the refrigerant within the system, for starting, stopping and controlling the flow of condensing fluid for the condenser of said system, said last named means operating through said thermally controlled means for stopping said motor when the pressure within said system rises above a predetermined maximum.

In testimony whereof we have hereunto set our hands in presence of two subscribing witnesses.

REUBEN E. BECHTOLD.
ALFRED W. MELLOWES.

Witnesses:
RALPH B. POMEROY,
MINNIE MAY ANDERSON.